Feb. 19, 1957 C. F. ROBINSON 2,782,337
SUPPORTING MEANS FOR VACUUM ELECTRODES
Filed June 22, 1953
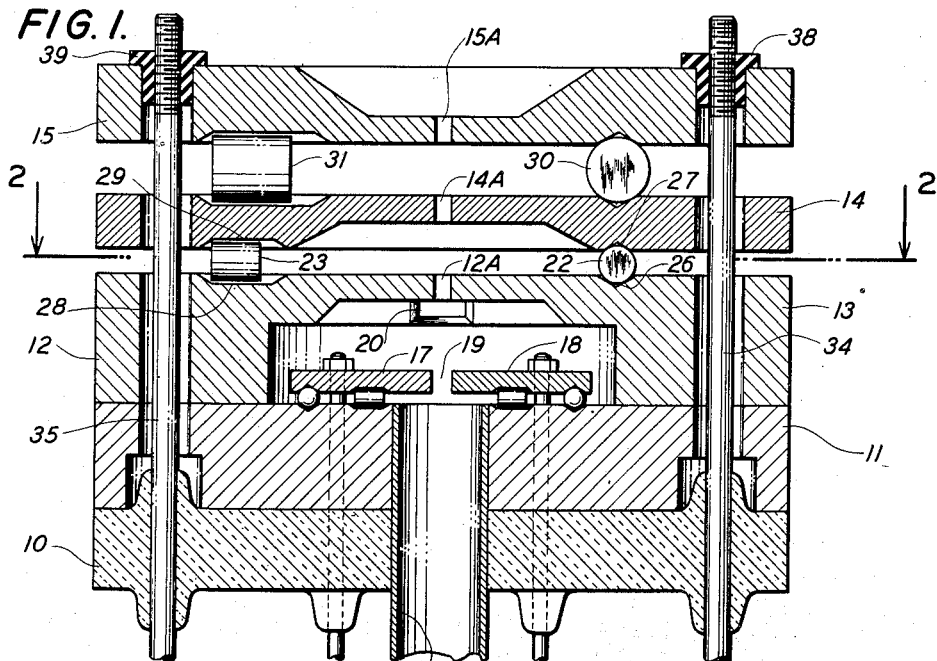
FIG. 1.
FIG. 2.
FIG. 3.
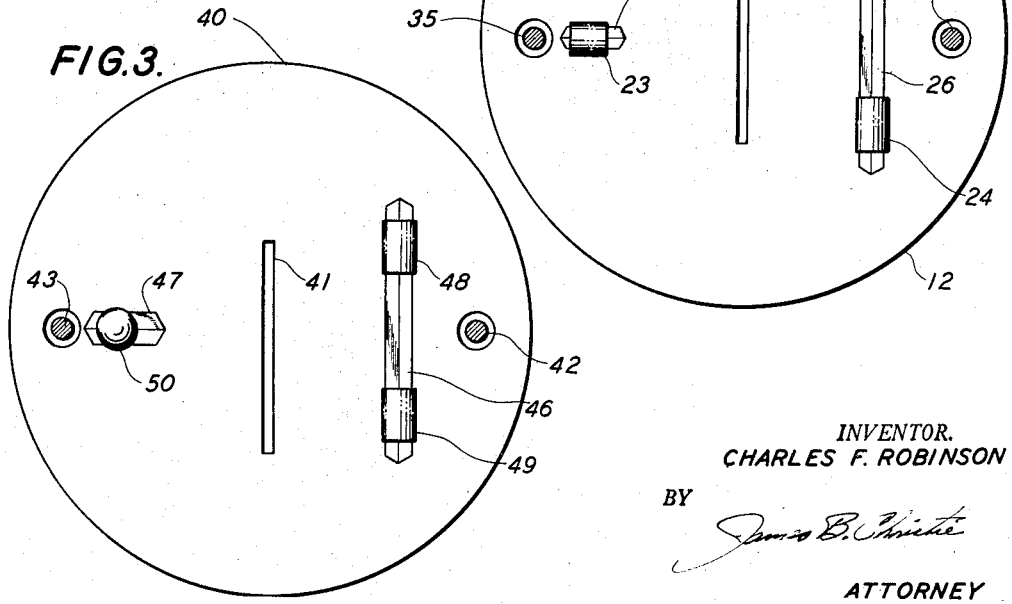
INVENTOR.
CHARLES F. ROBINSON
BY
*James B. Christie*
ATTORNEY United States Patent Office 2,782,337
Patented Feb. 19, 1957

2,782,337

SUPPORTING MEANS FOR VACUUM ELECTRODES

Charles F. Robinson, Pasadena, Calif., assignor, by mesne assignments, to Consolidated Electrodynamics Corporation, Pasadena, Calif., a corporation of California Application June 22, 1953, Serial No. 363,326

11 Claims. (Cl. 313—250)

This invention relates to vacuum tubes and more particularly to improvements in electrode mounting within such tubes. The invention is directed to improvements in the mounting means illustrated and described in United States Patent 2,581,446, issued to me on January 8, 1952.

The problem of supporting electrodes in precise geometric relation within a vacuum system is often quite severe. The difficulty arises from the fact that such electrodes must be insulated from each other and yet preferably mounted to insure a fixed spatial relationship. To achieve geometric precision, it is desirable that the electrodes be tied together in some fashion, it being virtually impossible to maintain a fixed spatial relationship between independently mounted electrodes. Moreover, in many instances, as for example in a mass spectrometer ion source, it is desirable to tie the plurality of electrodes comprising the source together as a unit to simplify removal of the electrode group from the vacuum system.

I have now developed an improved system of electrode mounting which comprises a plurality of insulating spacers disposed between adjacent electrodes and seating in aligned elongated grooves in proximal faces of adjacent electrodes, and means clamping the electrode group against the spacers. In preferred construction two elongated grooves are formed in the electrode face on opposite sides of the center of the electrode with the two grooves being normal to each other. One of the grooves is preferably radially disposed with respect to the center point of the electrode. A spherical or cylindrical spacer is seated in this groove and in a corresponding aligned groove in an adjacent electrode, and a pair of cylindrical or spherical spacers are seated at spaced points in the other of the two grooves and correspondingly in an aligned groove in the proximal face of the adjacent electrode.

By the expedient of the present invention all of the advantages of the mounting structure illustrated and described in Patent 2,581,446 are realized together with the additional advantages that it is a completely kinematic mounting, there being no over-constraint developed. Furthermore, the present invention has additional practical advantages over the method described in Patent 2,581,446 in that the grooves of the present invention can often be stamped or coined into the metal, thus avoiding a machining operation. Additionally, the drilled holes of the previous invention very often require venting in order to avoid entrapment of air behind the balls. Such vent holes involve an additional machining operation and they are difficult to clean and to inspect. The present system avoids any air entrapment, thus eliminating the necessity for venting holes, and the V grooves are intrinsically easier to clean and to inspect than a drilled hole. Additionally, the drilled hole construction of Patent 2,581,446 tends to introduce an electric stress concentration at the surface of the insulating ball which may aggravate electrical breakdown problems, whereas the present construction can be designed so as to avoid such stress concentration. Finally, it is easy with the present construction to maintain narrow plate spacings, down to .005" or less, whereas the maintenance of such narrow plate spacings by the method of Patent 2,581,446 involves counterboring of the drilled holes, which is an additional machining operation very difficult to perform with the necessary precision.

The invention is particularly applicable to use in the ion source of a mass spectrometer, and although in no way so limited is herein described in such application. A mass spectrometer is an analytical instrument for sorting and measuring ions according to their mass-to-charge ratio. The instrument includes an ion source in which molecules of a mixture to be analyzed are ionized by bombardment with an electron beam or by other known methods, and are propelled from the ionizing region under the influence of a potential established between the various members of an electrode system within the ion source. A frequently used electrode arrangement includes a pair of coplanar repeller electrodes through which gas molecules are introduced into the path of an electrode beam, a first accelerating electrode having a slit therein through which the ions, as they are formed, are propelled under the influence of a potential established between the repeller electrode and first accelerating electrode, and at least one additional accelerating electrode through which the ions pass, being accelerated in their travel between the several electrodes. In order to establish the accelerating potential it is necessary that the several electrodes be insulated from each other, and in previous preferred practice all of the electrodes are mounted from a single mounting plate by a plurality of tie rods suitably insulated from the electrodes through which they pass.

The invention as applied to an ion source of the type described will be clearly understood from the following detailed description thereof taken in conjunction with the accompanying drawing in which:

Fig. 1 is a sectional elevation through an ion source of a mass spectrometer with the electrodes of the ion source being held in fixed geometric relation in accordance with the invention;

Fig. 2 is a horizontal section taken on the line 2—2 of Fig. 2; and

Fig. 3 is a horizontal section similar to that of Fig. 2 showing an alternative mounting arrangement.

The ion source illustrated in Figs. 1 and 2 comprises an insulating plate 10, a first conductive plate 11, a second conductive plate 12 overlying the first plate and resting thereon. The second conductive plate is hollowed out to form an ionization chamber 13. A pair of accelerating electrodes 14, 15 are mounted in spaced alignment with the conductive plate 12. A sample inlet tube 16 extends through the insulating plate and first conductive plate opening into the ionization chamber 13. A pair of repeller electrodes 17, 18 are mounted in the ionization chamber and are separated by a passageway 19 through which gas molecules pass from the inlet tube 16 into the region of the ionization chamber above the repeller electrodes. A transverse electron beam originating from a source 20 is passed through the ionization chamber to ionize the molecules therein.

A potential difference is established between the repeller electrodes 17, 18, the conductive plate 12 defining the ionization chamber and the successive accelerating electrodes 14, 15 by means of suitable electrical circuitry well known in the art. The function of this ion source is to ionize sample molecules in the ionization chamber and to propel them from the chamber through slits 12A, 14A, 15A, in the respective electrodes 12, 14, 15 so that they issue through the terminal accelerating electrode 15 at a high velocity.

In the construction of an ion source as described there is the problem of separating accelerating electrodes 14 and 15 from the ionization chamber defining electrode 12 and in accurately fixed geometric relationship. In accordance with this invention, as embodied in Figs. 1 and 2, mounting is accomplished by means of insulating cylindrical spacers disposed between the electrodes and seating in aligned grooves in proximal faces of the electrodes. Referring to both Figs. 1 and 2, the electrode 14 is spaced from electrode 12 by three such cylindrical spacers 22, 23, 24. The spacers 22 and 24 are disposed in an elongated groove 26 formed in the face of electrode 12 eccentrically with the center of the electrode and preferably perpendicular to a radius thereof. The spacers 22, 24 also seat in a similarly oriented and vertically aligned groove 27 in the proximal face of the adjoining electrode 14. Spacer 23 seats in an elongated groove 28 formed in the face of the electrode 12 on the opposite side of the center of the electrode from groove 26, with the longitudinal axis of the groove 28 being normal to the longitudinal axis of the groove 26. The spacer 23 also seats in a like groove 29 formed in the proximal face of the adjoining electrode 14 and in vertical alignment with the groove 28.

The terminal accelerating electrode 15 is similarly spaced from the electrode 14, two spacers 30, 31 appearing in Fig. 1. A horizontal section similar to that of Fig. 2 and taken between the electrodes 14 and 15 would essentially duplicate Fig. 2 save for the size of the grooves and diameter of the spacers. Thus, as illustrated in Fig. 1, the separation between electrodes 14 and 15 exceeds the separation between electrodes 12 and 14. Variations in separation may be achieved in either of two ways. Insulators of differing diameter may be employed or, in the alternative, grooves of differing depth may be used to provide seats for insulators of uniform diameter. By way of example, the spacers of the diameter of the illustrated spacers 30 and 31 may be used in spacing the electrodes 12 and 14 in place of spacers 22, 23 and 24, as illustrated. The same separation between these electrodes may be achieved with the larger spacers by the simple expedient of determining the depth of the respective seating grooves in the proximal faces of the electrodes 12 and 14 so that an appropriate portion of the spacers of larger diameter will be confined within such deeper grooves.

The several electrodes of the ion source are clamped together by means of posts 34, 35 mounted through the insulator mounting plate 10 and extending through suitably enlarged and aligned holes in the succeeding electrodes. The terminal accelerating electrode 15 is fastened to the upper end of the posts by insulating bushings, two of which are illustrated in the sectional elevation of Fig. 1 and are identified by reference characters 38, 39. In this fashion the several electrodes are clamped to the insulating base 10 and about the insulated spacers as described. Repeller electrodes 17 and 18 may be spaced from the electrode plate 11 by similar cylindrical bushings as illustrated in Fig. 1.

By reference to the horizontal section of Fig. 2 it is apparent that by the use of grooved cavities to receive the insulating spacers the over-constraint inherent in the system illustrated in the above referenced patent is avoided. Each of the spacers 22, 23 and 24 is adjustable within its respective receiving grooves, and, moreover, relative displacement of the respective electrode and the insulating spacers is possible to accommodate temperature differentials encountered in operation.

To further facilitate attainment of equilibrium geometry responsive to temperature differentials between adjacent electrodes, a spherical spacer may be substituted for one or more of the cylindrical spacers illustrated in Fig. 2. A preferred modification is illustrated in Fig. 3 which is a plan view of the face of an accelerating electrode corresponding to the view of Fig. 2. Electrode 40, shown in Fig. 3, includes an ion exit slit 41, suitable holes 42, 43 through which mounting posts may be extended as illustrated, a first elongated groove 46 in the face of the electrode spaced outwardly from the center of the electrode and extending perpendicularly to a radius and a second elongated groove 47 formed on the opposite side of the center of the electrode and having a longitudinal axis normal to the longitudinal axis of the groove 46. To this extent the electrode 40 is identical to the electrode 12 illustrated in Fig. 2. In this embodiment a pair of cylindrical spacers 48, 49 are disposed in the groove 46 and are adapted to seat in a similar vertically aligned groove in an adjacent electrode. A spherical spacer 50 is mounted in groove 47 and is similarly adapted to seat in a corresponding vertically aligned groove in the proximal face of an adjacent electrode. Spherical spacer 50 provides a greater degree of freedom of relative displacement between the electrode 40 and an adjacent electrode spaced from it by the several spacers as may be induced by temperature differentials encountered in use. In the embodiment of Fig. 2 such displacement requires relative slippage between one or the other of the spaced electrodes and the cylindrical spacer 23. In the embodiment of Fig. 3 such relative displacement is accommodated by rotation of the spherical spacer 50, thus substantially eliminating sliding friction.

In all of the illustrated embodiments, care is taken that the spacers seat on the side walls and not on the bottoms of the respective grooves. It is important that the spacers be spaced from the groove bottoms to achieve the required accuracy of alignment.

It is possible within the contemplation of the invention to use spherical spacers to the exclusion of the illustrated cylindrical spacers with the limitation that such spacers are disposed in suitably elongated grooves so as to avoid over-constraint. However, the cylindrical spacers are preferred. Spherical spacers exhibit a point contact with the groove, and if appreciable clamping force is applied Brinelling may take place. This Brinelling does not impair the functioning of the assembly the first time it is put together, but does have the tendency to induce a small degree of over-constraint, which it is desired to avoid, and more importantly makes it difficult to obtain exactly the same alignment of the various parts on subsequent reassembly. Cylindrical spacers exhibiting line contact with the grooves do not develop any Brinelling under any reasonable clamping pressure.

As pointed out in my aforementioned patent it may, in some instances, be desirable to provide means for preventing the ion beam in an ion source from "seeing" the insulating spacers. Such means may take the form of conductive baffles or any of the other expedients disclosed in said patent for accomplishment of this objective.

I claim:

1. A vacuum tube comprising a plurality of electrodes, means holding the electrodes in fixed spaced relation comprising first and second insulating spacers disposed between adjacent electrodes and seated in spaced relation in a first pair of aligned grooves in proximal faces of the adjacent electrodes, a third insulating spacer disposed between the adjacent electrodes and seated in a second pair of aligned grooves in the proximal faces of the adjacent electrodes, each groove of the second pair being spaced from and oriented normal to the respective groove of the first pair, and clamping means clamping the electrodes against the spacers.

2. Apparatus according to claim 1 wherein the several spacers are cylindrical in form and are seated in the grooves with their longitudinal axes parallel to the longitudinal axes of the respective grooves.

3. Apparatus according to claim 1 wherein the first and second spacers are cylindrical in form and are seated in the respective grooves with their longitudinal axes parallel to the longitudinal axes of the grooves and the third spacer is spherical in form.

4. Apparatus according to claim 1 wherein at least one of the spacers is spherical in form.

5. Apparatus according to claim 1 in which at least one of the spacers is cylindrical in form and is seated in one of the grooves with its longitudinal axis parallel to the longitudinal axis of said groove.

6. A vacuum tube comprising a plurality of electrodes, means holding the electrodes in fixed spaced relation comprising first and second insulating spacers disposed between adjacent electrodes and seated in spaced relation in a first pair of aligned grooves formed in the proximal faces of the adjacent electrodes outwardly from the center of the electrode and perpendicularly to a radius from the center, a third insulating spacer disposed between the adjacent electrodes and seated in a second pair of aligned grooves formed in the proximal faces of the adjacent electrodes on the opposite side of the center thereof and extending perpendicularly to the first pair of aligned grooves, and clamping means clamping the electrodes against the spacers.

7. A mass spectrometer ion source comprising a plurality of electrodes with aligned slits therein for passage of an ion beam therethrough, means holding the electrodes in fixed geometric relationship comprising an insulating mounting plate, a plurality of cylindrical insulators disposed between adjacent electrodes and seated in grooves formed in adjoining faces of the adjacent electrodes, and clamping means affixing the mounting plate to the most remote electrode to clamp the electrodes against the insulators.

8. An electrode structure including a plurality of electrodes, the electrodes having a plurality of elongated straight grooves in their proximate faces, insulating spacers disposed between the electrodes and seated in and aligning the corresponding grooves in the faces of adjacent electrodes, and clamping means clamping the electrodes against the spacers whereby the electrodes are indexed by alignment of the grooves by the spacers.

9. A vacuum tube comprising a pair of electrodes, each electrode having a plurality of spaced elongated straight grooves in its face proximal to the other electrode, insulating spacers disposed between the electrodes and seated in and aligning corresponding grooves in the faces of the electrode pair, the spacers being of circular section in a plane perpendicular to the electrode faces and being of larger radius than the bottom of the respective grooves whereby they are supported off the bottom of the grooves, and means clamping the electrodes about the spacers.

10. A mass spectrometer ion source comprising a plurality of electrodes with aligned slits therein for passage of an ion beam therethrough and with a plurality of elongated straight grooves formed in the proximal faces of each of the electrodes, a plurality of insulators seated in and aligning corresponding grooves in adjoining faces of adjacent electrodes, the insulators being of circular section in a plane perpendicular to the adjoining faces of the adjacent electrodes, and means clamping the electrodes about the spacers.

11. An electrode structure including a plurality of electrodes, the electrodes having a plurality of elongated straight grooves in their proximal faces with one groove in each electrode being oriented normal to another groove in the same electrode face, a plurality of insulating spacers disposed between the electrodes and seated in and aligning corresponding grooves in the faces of adjacent electrodes, and clamping means clamping the electrodes against the spacers whereby the electrodes are indexed by alignment of the grooves by the spacers.

References Cited in the file of this patent

UNITED STATES PATENTS

| | | |
|---|---|---|
| 971,935 | Simon | Oct. 4, 1910 |
| 1,253,103 | Simon | Jan. 8, 1918 |
| 1,273,015 | Thomas | July 16, 1918 |
| 1,617,171 | Smith | Feb. 8, 1927 |
| 2,282,392 | Bieling | May 12, 1942 |
| 2,459,277 | Halstead et al. | Jan. 18, 1949 |
| 2,581,446 | Robinson | Jan. 8, 1952 |